United States Patent
Fuma et al.

[11] Patent Number: 6,069,855
[45] Date of Patent: May 30, 2000

[54] SYNCHRONOUS CIRCUIT AND OPTICAL DISK REPRODUCTION DEVICE CAPABLE OF REALIZING MORE PRECISE SYNCHRONIZATION

[75] Inventors: Masato Fuma, Aichi; Miyuki Okamoto, Gifu, both of Japan

[73] Assignee: Sanyo Electric Co., Ltd., Moriguchi, Japan

[21] Appl. No.: 08/975,048

[22] Filed: Nov. 20, 1997

[30] Foreign Application Priority Data

Nov. 22, 1996 [JP] Japan .................................. 8-327745

[51] Int. Cl.⁷ ........................................................ G11B 7/00
[52] U.S. Cl. ................................................ 369/47; 369/59
[58] Field of Search ............................... 369/47, 48, 124, 369/59; 360/40, 51; 375/368, 373

[56] References Cited

U.S. PATENT DOCUMENTS

Re. 33,665  8/1991  Ogawa ..................................... 369/47
5,677,935  10/1997  Karino .................................... 375/368

FOREIGN PATENT DOCUMENTS 2-306472  12/1990  Japan .

Primary Examiner—Thang V. Tran
Attorney, Agent, or Firm—Armstrong, Westerman, Hattori, McLeland & Naughton

[57] ABSTRACT

A synchronous circuit which detects a detection synchronizing signal generated from a reproduction signal in a detecting window having a prescribed time width, and in a detecting window having a prescribed time width, and generates a frame synchronizing signal. The synchronous circuit includes a counter for counting how many times detection synchronizing signals are not consecutively detected, and a detecting window width determining unit for increasing the time width of the detecting window if, as a result of comparison between a value counted by the counter and a prescribed value set in advance, the counted value reaches the prescribed value.

8 Claims, 8 Drawing Sheets

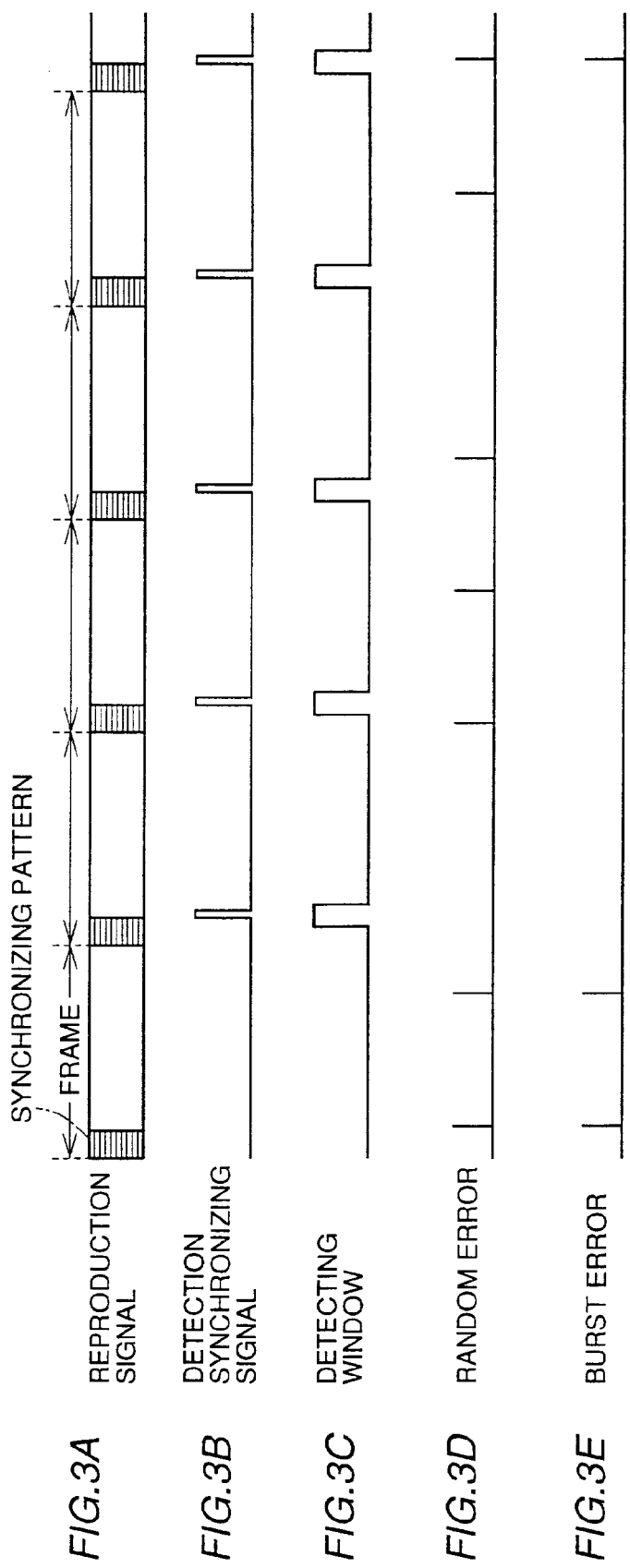

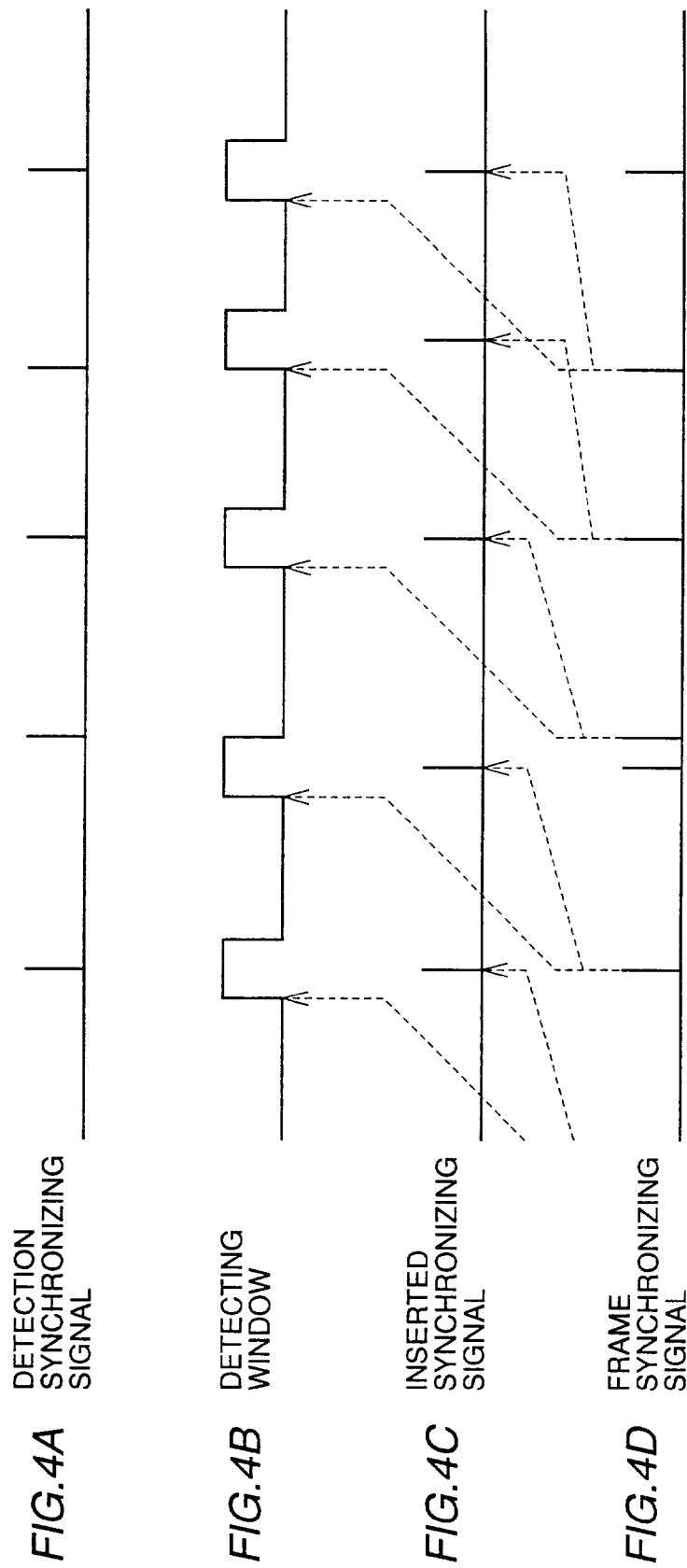
FIG.4A DETECTION SYNCHRONIZING SIGNAL
FIG.4B DETECTING WINDOW
FIG.4C INSERTED SYNCHRONIZING SIGNAL
FIG.4D FRAME SYNCHRONIZING SIGNAL

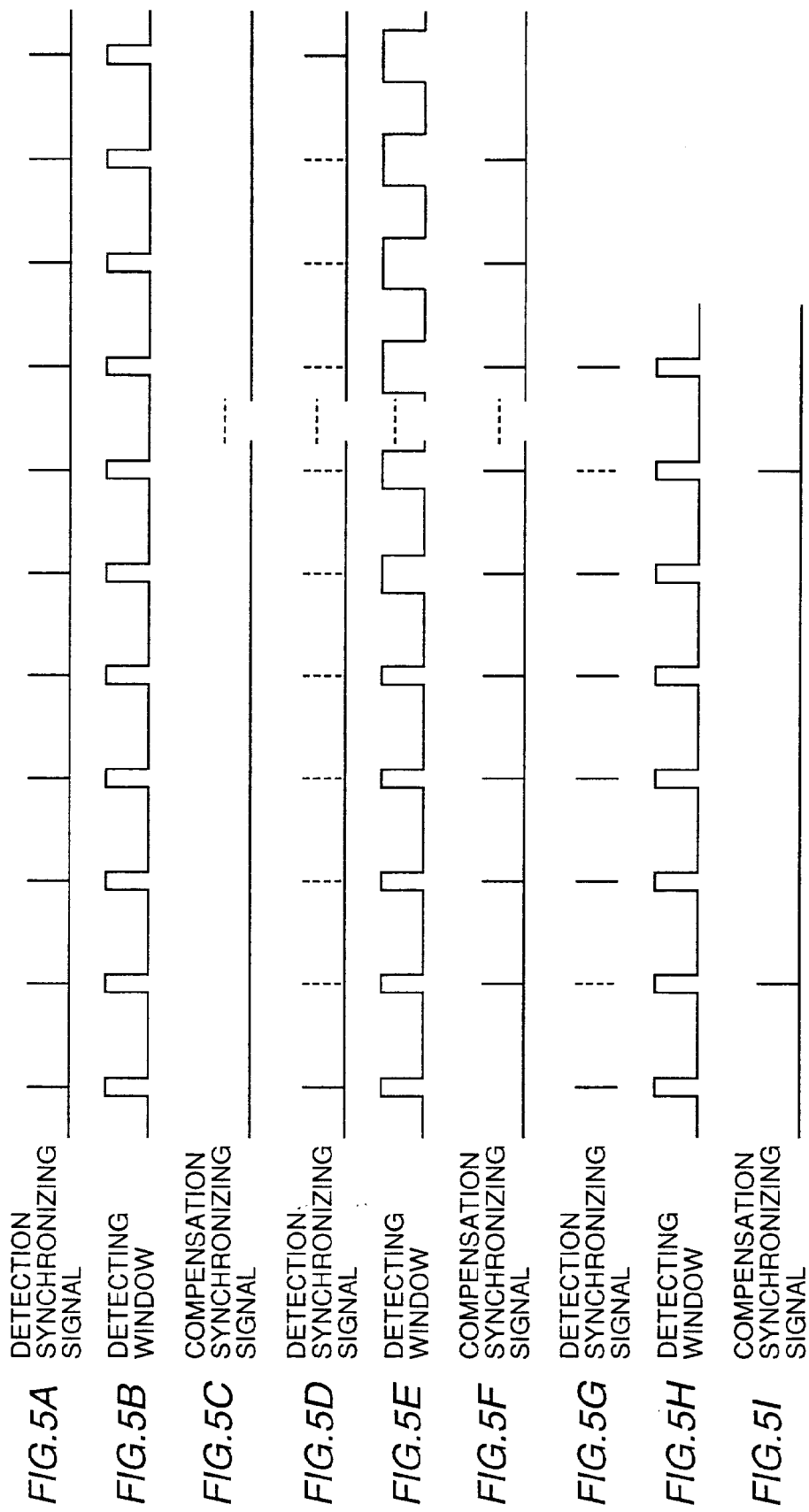

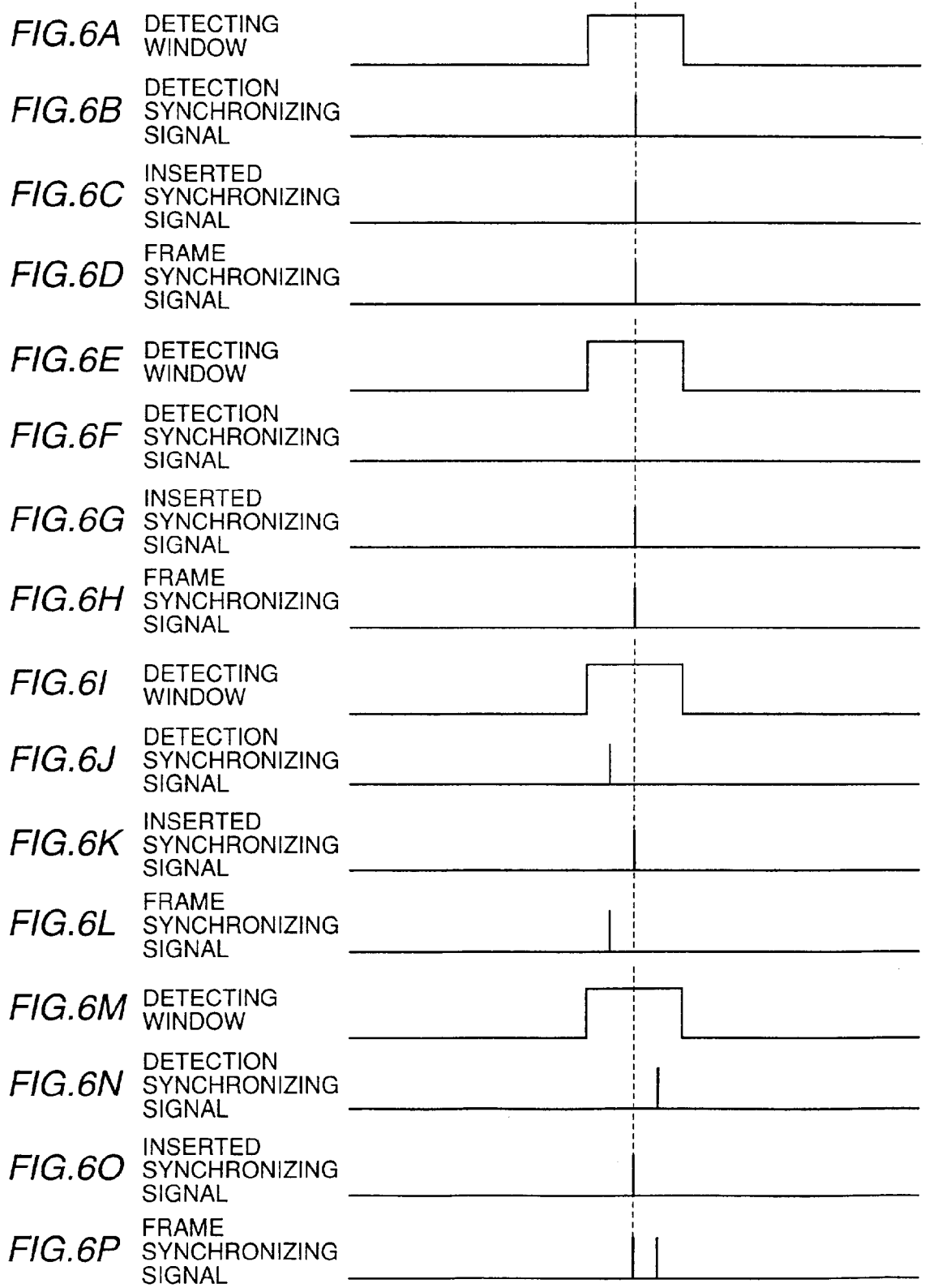

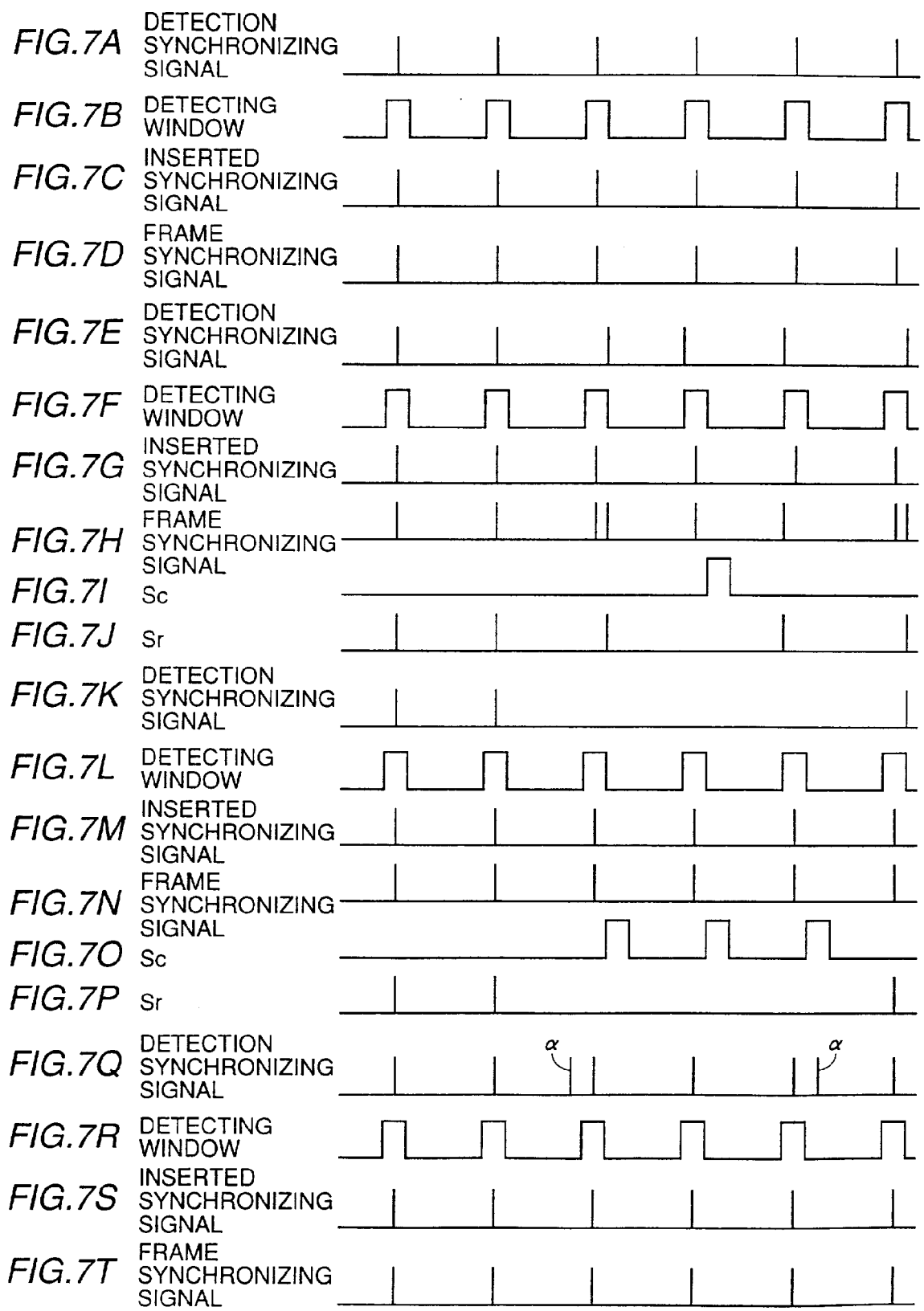

SYNCHRONOUS CIRCUIT AND OPTICAL DISK REPRODUCTION DEVICE CAPABLE OF REALIZING MORE PRECISE SYNCHRONIZATION

BACKGROUND OF THE INVENTION

1. Field of the Invention

The present invention relates to a synchronous circuit which generates a frame synchronizing signal by detecting a detection synchronizing signal generated from a reproduction signal, in a detecting window having a prescribed width, and to an optical disk reproduction device having the synchronous circuit.

2. Description of the Related Art

Japanese Patent Laying-Open No. 2-306472 discloses a synchronizing circuit which detects a synchronizing signal in a detecting window having a prescribed time width to produce a frame synchronizing signal. The synchronizing circuit increases, if a synchronizing signal is not detected, the width of the detecting window at a next detection timing to achieve a higher possibility of detecting a synchronizing signal at the next detection timing.

An optical disk reproduction device which reproduces a signal read from an optical disk by demodulating the signal is provided with an error correction circuit which corrects an error in data after demodulation. The ability to correct an error of the error correction circuit is growing. For example, in the specification of the digital video disk (DVD), even if there is a succession of reproduction errors in 32 frames, the errors can be corrected if the data preceding and following the reproduction errors can be correctly reproduced.

According to the synchronizing circuit disclosed in the Japanese Patent Laying-Open No. 2-306472, if a synchronizing signal is not detected, the width of the detecting window is increased at the next detection timing. However, the increase of the detecting window width enlarges the possibility of mistakenly recognizing, a bit string read accidentally as having the same array as a synchronizing pattern in a reproduction error or the like as the synchronizing pattern. One example of a detection synchronizing signal produced by mistakenly detecting a synchronizing pattern is shown as signal a in FIG. 7Q. Signal α is not mistakenly detected since signal α is not present in the detecting window. However, if the width of the detecting window is increased, a frame synchronizing signal based on signal a produced by the mistaken detection may be generated.

In the optical disk reproduction device having the enhanced ability of correcting an error, an error in one frame can be easily corrected. In other words, if one synchronizing signal or a small number of consecutive synchronizing signals is/are not detected, there is no problem about reproduction of data. Therefore, there is no need to increase the width of the detecting window immediately after a synchronizing signal is not detected as in the synchronizing circuit disclosed in the Japanese Patent Laying-Open No. 2-306472. On the other hand, if the width of the detecting window is increased immediately after a synchronizing signal is not detected, the possibility of producing an erroneous synchronization could be increased due to an erroneous detection of a synchronizing pattern.

Generally, increase of the width of the detecting window is advantageous when the position of the detected synchronizing pattern is not at an originally expected normal position, not when a random error is produced as shown in FIG. 3D in which a synchronizing pattern cannot be detected due to a reproduction error or the like. In such a case, synchronizing signals are not consecutively detected as in the case of a burst error shown in FIG. 3E. As a result, errors beyond the correction ability of the error correction circuit are produced resulting in any trouble in reproduction of data.

SUMMARY OF THE INVENTION

One object of the present invention is to provide a synchronous circuit in which the possibility of producing a mistaken synchronization is reduced as much as possible by increasing the width of a detecting window step-by-step if synchronizing signals are not consecutively detected to make error correction impossible, and by which a resynchronization is easily produced. Another object of the invention is to provide an optical disk reproduction device in which synchronization is produced to enable data to be suitably reproduced without increasing the possibility of producing a mistaken synchronization due to a mistaken detection of a synchronizing pattern.

According to one aspect of the invention, a synchronous circuit detects a first synchronizing signal generated from a reproduction signal in a detecting window having a prescribed time width and generates a second synchronizing signal. The synchronous circuit includes a counter which counts how many times the first synchronizing signals are not consecutively detected (i.e. counts the consecutively non-detected number of times of the first synchronizing signals), a comparison circuit which compares the non-detected number counted by the counter with a prescribed value, and a window control circuit which increases the time width of the detecting window if the non-detected number reaches a prescribed value as a result of the comparison by the comparison circuit.

According to another aspect of the invention, a synchronous circuit detects a first synchronizing signal generated from a reproduction signal in a detecting window having a prescribed time width and generates a second synchronizing signal. The synchronous circuit includes a counter which counts how many times the first synchronizing signals are not consecutively detected (i.e. counts the consecutively non-detected number of times of the first synchronizing signals), a storage circuit which stores a value of the non-detected number and a time width corresponding to the value of the non-detected number, a comparison circuit which compares the value counted by the counter with the value of the non-detected number stored in the storage circuit, and a control circuit which sets the time width of the detecting window at a time width corresponding to the value of the non-detected number in the storage circuit if the counted value equals to or more than the value of the non-detected number in the storage circuit as a result of the comparison by the comparison circuit.

According to still another aspect of the invention, an optical disk reproduction device includes a synchronizing signal generating circuit which detects a first synchronizing signal generated from a reproduction signal read from an optical disk in a detecting window having a prescribed time width, and generates a second synchronizing signal, and includes a window control circuit which increases the prescribed time width of the detecting window according to how many times the first synchronizing signals are not consecutively detected in the detecting window.

One advantage of the present invention is that optimum synchronizing compensation is possible without increasing the possibility of mistakenly detecting a bit string, which is accidentally read as having the same array as a synchronizing pattern due to a reproduction error, as the synchronizing pattern.

Another advantage of the invention is that optimum synchronizing compensation and data reproduction are possible since a time width of a detecting window is increased step by step according to an error correction ability of an error correction circuit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3A–3C are provided for describing a method of detecting a frame synchronizing signal using a detecting window, and FIGS. 3D and 3E are provided for describing a case in which a synchronizing signal is not detected.

FIGS. 4A–4D are provided for describing generation of a detecting window and an inserted synchronizing signal based on a frame synchronizing signal.

FIGS. 5A–5I are provided for describing a relation among a detection synchronizing signal, a detecting window and a compensation synchronizing signal. Specifically, FIGS. 5A–5C show a case in which there is no missing detection synchronizing signal, FIGS. 5D–5F show a case in which detection synchronizing signals are not consecutively detected, and FIGS. 5G–5I show a case in which detection synchronizing signals are not detected intermittently.

FIGS. 6A–6P are provided for describing a state in which a frame synchronizing signal is generated according to a detection synchronizing signal and an inserted synchronizing signal. Specifically, FIGS. 6A–6D show a case in which a detection synchronizing signal and an inserted synchronizing signal are generated at the same timing, FIGS. 6E–6H show a case in which a detection synchronizing signal is missing, FIGS. 6I–6L show a case in which a detection synchronizing signal is generated prior to an inserted synchronizing signal, and FIGS. 6M–6P show a case in which an inserted synchronizing signal is generated prior to a detection synchronizing signal.

FIGS. 7A–7T show a relation among a detection synchronizing signal, a detecting window, an inserted synchronizing signal, a frame synchronizing signal, a pulse signal Sc, and a pulse signal Sr. Specifically, FIGS. 7A–7D show a case in which a detection synchronizing signal is detected at a normal position, FIGS. 7E–7J show a case in which a detection synchronizing signal is detected at a position shifted from a normal position, FIGS. 7K–7P show a case in which a detection synchronizing signal is not detected, and FIGS. 7Q–7T show a case in which a detection synchronizing signal is mistakenly detected.

DESCRIPTION OF THE PREFERRED EMBODIMENTS

Figure 1:
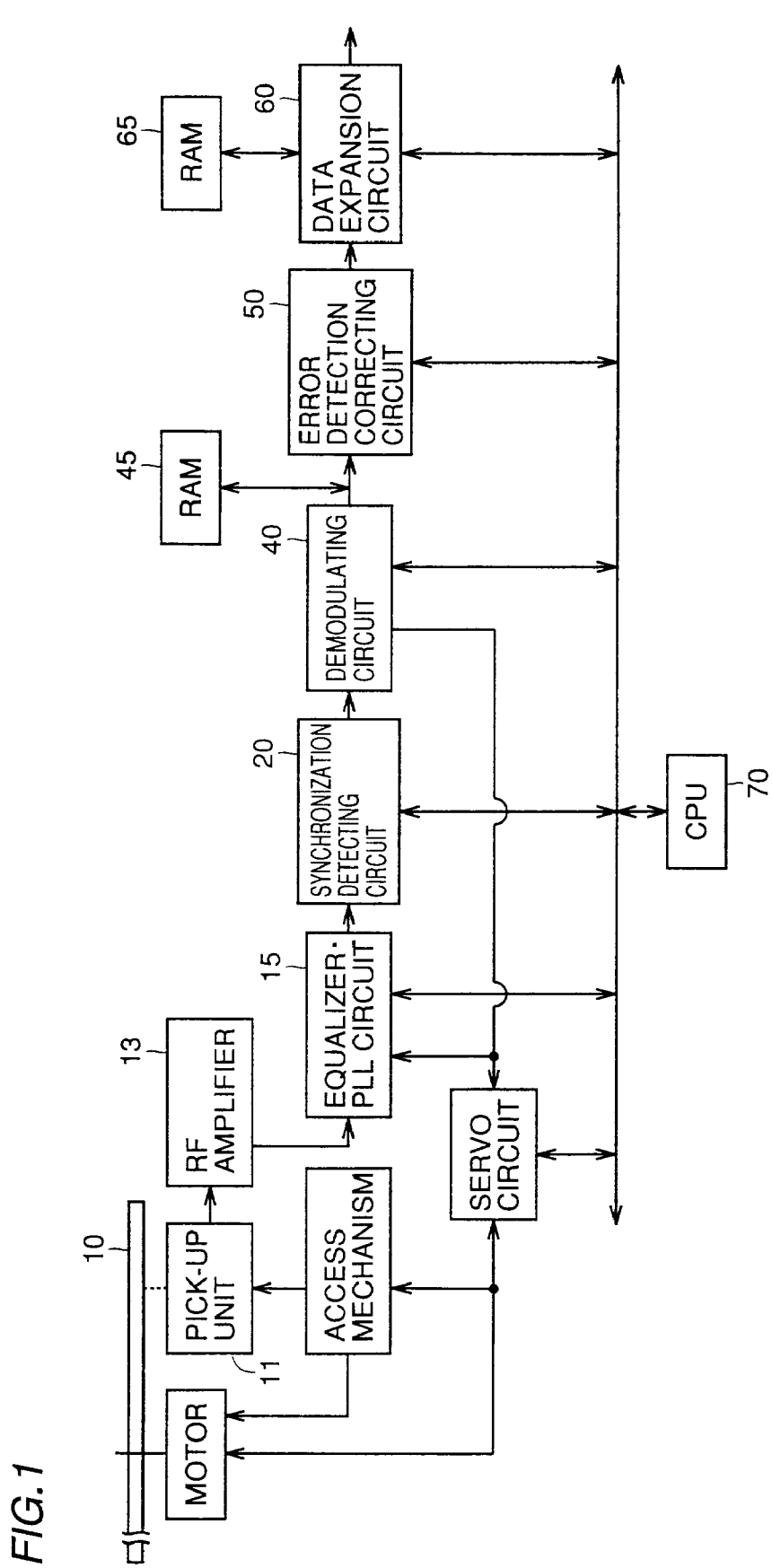
FIG. 1 is a block diagram showing a structure of an optical disk reproduction device according to an embodiment of the invention.

An embodiment of the invention is hereinafter described in detail referring to the attached figures. In those figures, like reference characters indicate like or corresponding elements.

An optical disk (DVD) reproduction device shown in FIG. 1 includes: a pickup unit 11 which radiates a laser beam to a DVD 10, detects the reflected light and carries out photoelectric conversion for it; an RF amplifier 13 which generates a reproduction signal by amplifying a signal detected by pickup unit 11; an equalizer·PLL circuit 15 connected to RF amplifier 13; a synchronization detecting circuit 20 connected to equalizer·PLL circuit 15; a demodulating circuit 40 connected to synchronization detecting circuit 20; a RAM 45 connected to demodulating circuit 40; an error detection correcting circuit 50 connected to demodulating circuit 40 and RAM 45; a data expansion circuit 60 connected to error detection correcting circuit 50; a RAM 65 connected to data expansion circuit 60; and a CPU 70 connected to equalizer·PLL circuit 15, synchronization detecting circuit 20, demodulating circuit 50, error detection correcting circuit 50, data expansion circuit 60 and the like via a bus. The optical disk (DVD) reproduction unit reproduces information recorded on DVD 10 by applying a prescribed processing to the obtained reproduction signal. Although a reproduction unit used for DVD 10 is described as one example in this embodiment since it has a superior ability of correcting an error, the invention is applicable to a synchronous circuit and a reproduction unit used for optical disks of other types.

An operation of the optical disk reproduction device is described below. A reproduction signal output from RF amplifier 13 is supplied to equalizer·PLL circuit 15 in which the reproduction signal undergoes waveform equalization and bit synchronization. The reproduction signal output from equalizer·PLL circuit 15 is supplied to synchronization detecting circuit 20 in which a frame synchronizing signal is generated. Specifically, as shown in FIG. 3A, a synchronizing pattern (32-bit information in the specification of DVD) formed of a prescribed bit array is added to the leading end of each frame of the reproduction signal. A detection synchronizing signal shown in FIG. 3B is generated by detecting the synchronizing pattern. A frame synchronizing signal is generated by detecting the detection synchronizing signal in a detecting window formed of a high level pulse shown in FIG. 3C.

A data stream included in the reproduction signal is input to demodulating circuit 40 to be demodulated according to the frame synchronizing signal generated by synchronization detecting circuit 20. For example, in the specification of DVD, 16-bit data stream is demodulated into 8-bit data stream. The demodulated data stream is temporarily stored in RAM 55, and thereafter supplied to error detection correcting circuit 50 and error correction is carried out for the data stream. Data having its error corrected is supplied to data expansion circuit 60 and undergoes data expansion using RAM 65. The expanded data is output to the outside. The operation above is controlled by CPU 70.

Figure 2:
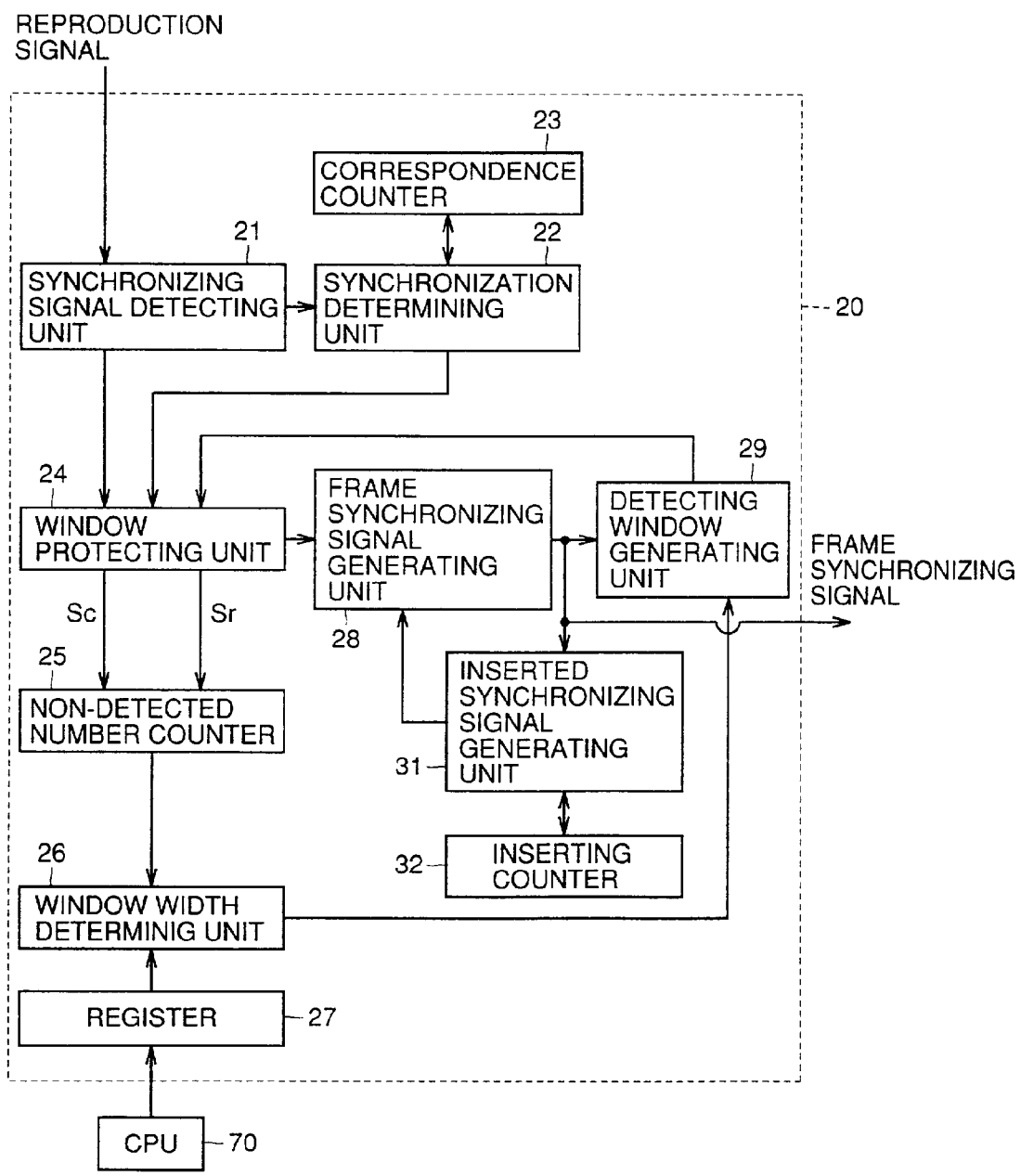
FIG. 2 is a block diagram specifically showing a structure of a synchronization detecting circuit shown in FIG. 1.

FIG. 2 is a block diagram showing a structure of synchronization detecting circuit 20 in FIG. 1. As shown in FIG. 2, synchronization detecting circuit 20 includes: a synchronizing signal detecting unit 21 which receives a reproduction signal to generate a detection synchronizing signal; a synchronization determining unit 22 connected to synchronizing signal detecting unit 21; a correspondence counter 23 connected to synchronization determining unit 22; a window protecting unit 24 connected to synchronizing signal detecting unit 21 and synchronization determining unit 22; a frame synchronizing signal generating unit 28 connected to window protecting unit 24; a detecting window generating unit 29 connected to frame synchronizing signal generating unit 28; an inserted synchronizing signal generating unit 31 connected to frame synchronizing signal generating unit 28; an inserting counter 32 connected to inserted synchronizing signal generating unit 31; a non-detected number counter 25 connected to window protecting unit 24; a window width determining unit 26 connected to non-detected number counter 25; and a register 27 connected to window width determining unit 26.

An operation of synchronization detecting circuit 20 is described below. The reproduction signal input to synchronization detecting circuit 20 is first supplied to synchronizing signal detecting unit 21, and the synchronizing pattern is detected. The detection synchronizing signal shown in FIG. 3B is thereafter generated by detecting the synchronizing pattern, and the generated detection synchronizing signal is supplied to synchronization determining unit 22. In synchronization determining unit 22, whether detection synchronizing signals are consecutively generated or not is determined. Specifically, the number of detection synchronizing signals consecutively generated is counted by correspondence counter 23. When the counted value reaches a prescribed value which is set in advance, transition of synchronization detecting circuit 20 from a full open state to a synchronization state occurs and a signal indicating the transition is passed from synchronization determining unit 22 to window protecting unit 24. The full open state refers to a state in which there is no synchronization and the detecting window is infinite in width.

The detection synchronizing signal generated by synchronizing signal detecting unit 21 is also supplied to window protecting unit 24. A detecting window is passed from detecting window generating unit 29 to window protecting unit 24. If a detection synchronizing signal is detected in the detecting window, a synchronizing signal according to the detection synchronizing signal is supplied to frame synchronizing signal generating unit 28. As shown in FIGS. 4A–4D, detecting window generating unit 29 generates a detecting window having a high level for a prescribed time determined by window width determining unit 26 after a certain time corresponding to a prescribed clock number has passed from generation of a frame synchronizing signal according to the detection synchronizing signal by frame synchronizing signal generating unit 28. If the frame synchronizing signal is generated at a timing shifted forward or backward from a normal timing, a timing at which a corresponding detecting window is generated is also shifted forward or backward. Initially information on a time width determined to correspond to 5 clock numbers with a clock signal of 26.16 MHz is supplied from window width determining unit 26 to detecting window generating unit 29. The numerical values are provided as one example, and not limited ones.

As shown in FIGS. 4C and 5D, an inserted synchronizing signal is generated according to the frame synchronizing signal in inserted synchronizing signal generating unit 31. The inserted synchronizing signal is a pseudo synchronizing signal generated after a time corresponding to a prescribed clock number has passed from the time at which the frame synchronizing signal according to the detection synchronizing signal shown in FIG. 4A is generated. The prescribed clock number above is counted by inserting counter 32. The inserted synchronizing signal is passed to frame synchronizing signal generating unit 28. If a detection synchronizing signal is not detected in a detecting window, the inserted synchronizing signal is used as a compensation synchronizing signal as shown in FIGS. 5A–5I. Specifically, as shown in FIGS. 5A–5C, in a normal case in which detection synchronizing signals are consecutively generated, the compensation synchronizing signal is unnecessary. If some detection synchronizing signals are not generated as shown in FIGS. 5D–5I (Note that missing detection synchronizing signals are shown by broken lines, similarly in FIG. 8B.), an inserted synchronizing signal is used as a compensation synchronizing signal instead of the missing detection synchronizing signal. A frame synchronizing signal according to the compensation synchronizing signal is generated in frame synchronizing signal generating unit 28.

A relation among a detecting window generated in detecting window generating unit 29, a detection synchronizing signal generated in synchronizing signal detecting unit 21, an inserted synchronizing signal generated in inserted synchronizing signal generating unit 31 and a frame synchronizing signal generated in frame synchronizing signal generating unit 28 is shown in FIGS. 6A–6P. Specifically, referring to FIGS. 6A–6D, if a detection synchronizing signal is detected in a detecting window, a frame synchronizing signal is generated according to the detection synchronizing signal. Referring to FIGS. 6E–6H, if a detection synchronizing signal is not detected in a detecting window, a frame synchronizing signal is generated according to an inserted synchronizing signal. Referring to FIGS. 6I–6L, if a detection synchronizing signal is detected prior to an inserted synchronizing signal, a frame synchronizing signal is generated according to the detection synchronizing signal. Further, referring to FIGS. 6M–6P, if an inserted synchronizing signal is detected prior to a detection synchronizing signal, a frame synchronizing signal is generated according to the inserted synchronizing signal and a frame synchronizing signal is also generated according to the detection synchronizing signal. In this case, as shown in FIGS. 4B–4D, a detecting window and an inserted synchronizing signal are generated based not on the frame synchronizing signal which is first generated, but on the frame synchronizing signal thereafter generated.

FIGS. 7A–7T specifically show a relation between a detection synchronizing signal, a detecting window and an inserted synchronizing signal, and a frame synchronizing signal generated according to those. Referring to FIGS. 7A–7D, if a detection synchronizing signal is detected at a normal position in a detecting window, a frame synchronizing signal is generated according to the detection synchronizing signal. Referring to FIGS. 7E–7H, if a detection synchronizing signal is detected at a time shifted backward from the time of detection of an inserted synchronizing signal, a frame synchronizing signal is generated according to the inserted synchronizing signal and the detection synchronizing signal. Referring to FIGS. 7K–7N, if a detection synchronizing signal is not detected, a frame synchronizing signal is generated according to an inserted synchronizing signal. Further, as shown in FIGS. 7Q–7T, even if a detection synchronizing signal is generated at a timing other than a normal position (timing) due to mis-detection of a synchronizing pattern, a frame synchronizing signal according thereto is not generated if the detection synchronizing signal is not detected in the detecting window.

Window protecting unit 24 shown in FIG. 2 supplies pulse signal Sc shown FIGS. 7I and 7O to non-detected number counter 25 if a detection synchronizing signal supplied from synchronizing signal detecting unit 21 is not detected in a detecting window. Non-detected number counter 25 counts how many times detection synchronizing signals are not detected according to pulse signal Sc. If window protecting unit 24 detects a detection synchronizing signal in a detecting window again, pulse signal Sr showing the re-detection is supplied to non-detected number counter 25 and counter 25 is reset.

The number of times the detection synchronizing signals are not counted consecutively (consecutively non-detected number) counted by non-detected number counter 25 is supplied to window width determining unit 26. In register 27, a determination reference table supplied from CPU 70 in advance is stored. One example of the determination reference table is shown in Table 1 below.

TABLE 1

| Value of Non-Detected Number | Detecting Window Width (Clock Number) |
| --- | --- |
| 4 | 10 |
| 8 | 15 |
| 12 | 20 |
| 16 | 25 |
| 20 | 30 |
| 24 | 35 |
| 28 | 40 |

Window with determining unit 26 compares the consecutively on-detected number counted by non-detected number counter 25 with the value of non-detected number in the determination reference table stored in register 27. In other words, window width determining unit 26 determines if the non-detected number counted by non-detected number counter 25 reaches a prescribed value.

If the non-detected number counted by non-detected number counter 25 reaches a prescribed value of non-detected number as a result of the determination, a value of the width of a detecting window corresponding to the non-detected number value is supplied to detecting window generating unit 29. Detecting window generating unit 29 supplies a detecting window having a changed width to detecting window protection unit 24 from the next detection timing.

As shown in Table 1, FIGS. 5D and 5E, for example, when the consecutively non-detected number of the detection synchronizing signals is 4, the width of the detecting window is increased from 5 clock number to 10 clock number starting from the fifth detection timing. Further, if the synchronizing signals are not detected consecutively and the non-detected number reaches 8, the width of the detecting window is increased to 15 clock number. In other words, the width of the detecting window is increased step by step according to the consecutively non-detected number. Control of the detecting window width is achieved as follows. Information on the value of the non-detected number and the width of the detecting window corresponding to the non-detected number value is stored in register 27 in advance. The set value of the non-detected number is compared with the counted value (non-detected number) input from non-detected number counter 25. If those values are equal to each other, information on the width of the detecting window corresponding to the equal non-detected number value is supplied to detecting window generating unit 29 and a detecting window having the width is generated by the detecting window generating unit 29.

The value of the non-detected number described above can be determined considering the error correction ability of error detection correcting circuit 50 shown in FIG. 1 (maximum 32 frames in the specification of DVD).

In order to simplify the structure of register 27, only one set of the value of the non-detected number and the width of the detecting window corresponding to the non-detected number value may be stored in register 27. CPU 70 may control window width determining unit 26 such that window width determining unit 26 supplies to detecting window generating unit 29, information on the width of the window n times larger than that of the detecting window stored in register 27 when the value counted by non-detected number counter 25 reaches a value n times (n is a natural number) larger than the stored value of the non-detected number.

Considering that a timing at which a synchronizing pattern of a next frame is expected to be detected becomes less precise as the consecutively non-detected number increases, the possibility of detecting a detection synchronizing signal can be increased by setting the width of the detecting window in the determination reference table stored in register 27 to be sufficiently larger as the value of the non-detected number increases.

Synchronization detecting circuit 20 is structured such that the determination reference table stored in register 27 is supplied from CPU 70 by, for example, operating an operation unit of the reproduction device. Accordingly, an optimum width of the detecting window can be set, for maintaining the synchronism and reestablishing the synchronism after no synchronizing signal is detected, according to characteristics of the optical disk reproduction device (mechanical characteristics like the servo type and the correction ability of error detection correcting circuit 50 shown in FIG. 1). In other words, synchronizing compensation for achieving synchronism again is possible without increasing the possibility of mistakenly detecting a synchronizing pattern.

Figure 8A:
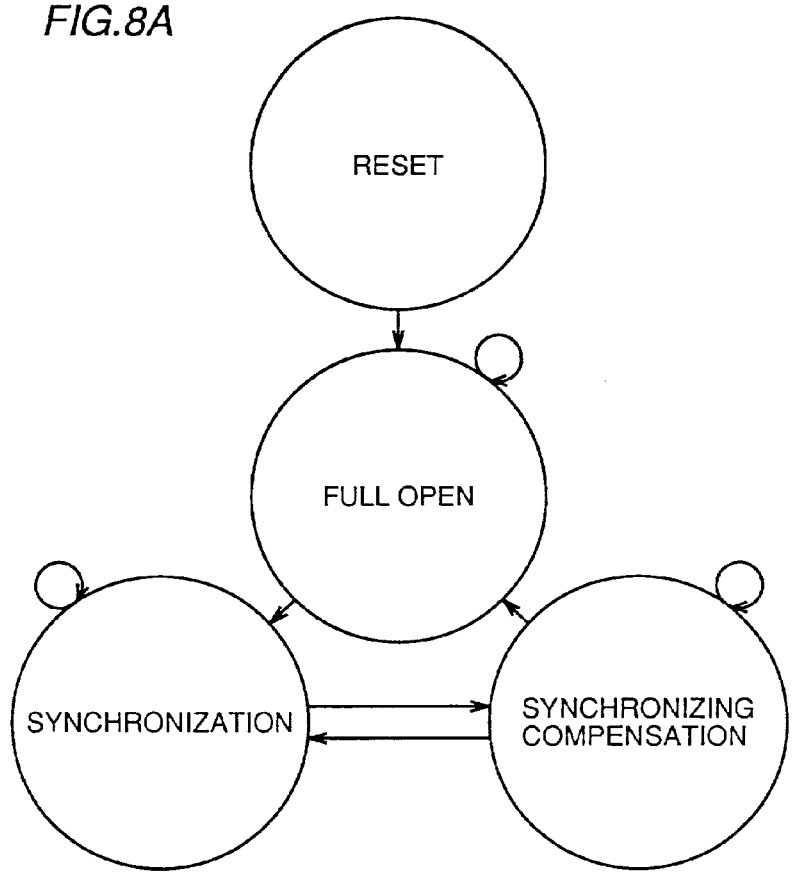
FIG. 8A shows transition of a state of a synchronization detecting circuit.
Figure 8B:
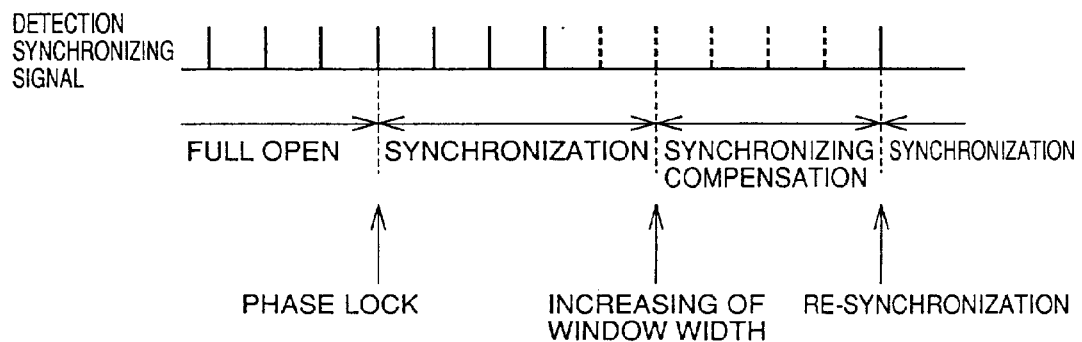
FIG. 8B shows transition of a state of the synchronization detecting circuit on a time axis.

In synchronization detecting circuit 20, the transition of the synchronization state shown in FIGS. 8A and 8B is caused to occur. Specifically, if detection synchronizing signals are consecutively counted a set number of times by correspondence counter 23 shown in FIG. 2 in the full open state in which synchronization is not achieved, transition to the synchronization state occurs by the phase lock as shown in FIG. 8B. If the detection synchronizing signal is not detected in the synchronization state, synchronization based on an inserted synchronizing signal is produced. When the non-detected number of detection synchronizing signals counted by non-detected number counter 25 reaches a prescribed value set in register 27, the width of the detecting window is increased to enable synchronizing compensation. In addition, when a detection synchronizing signal is detected in the detecting window again in the state of the synchronizing compensation, synchronization is re-produced. When detection synchronizing signals are not consecutively detected 32 times in the synchronizing compensation state, transition to the full open state occurs. The number of correctable error frames varies depending on the error correction ability of the reproduction device. Therefore, the timing of the transition to the full open state should be changed according to such error correction ability. As the method for the phase locking, a conventionally known type can be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A synchronous circuit which detects a first synchronizing signal generated from a reproduction signal in a detecting window having a prescribed time width and generates a second synchronizing signal, comprising:

a counter for counting consecutively non-detected times of said first synchronizing signal;

a memory for storing a predetermined value of non-detected times and a time width corresponding to said predetermined value of non-detected times;

a comparator for comparing the times counted by said counter with said predetermined value of non-detected times; and a controller for increasing said prescribed time width of the detecting window into said time width corresponding to said predetermined value of non-detected times when said counted times reach said predetermined value of non-detected times as a result of the comparison by said comparator.

2. The synchronous circuit according to claim 1, wherein said predetermined value of non-detected times and said time width corresponding to said predetermined value of non-detected times are externally set in said memory.

3. A recording medium reproduction device comprising:

a synchronizing signal generator for generating a second synchronizing signal by detecting a first synchronizing signal generated from a reproduction signal read from a recording medium in a detecting window having a prescribed time width; and a window controller for increasing said prescribed time width of said detecting window according to a consecutively non-detected times of said first synchronizing signal, wherein said window controller includes:

a counter for counting consecutively non-detected times of said first synchronizing signal in said detecting window, a memory for storing a predetermined value of non-detected times and a time width corresponding to said predetermined value of non-detected times, a comparator for comparing said consecutively non-detected times counted by said counter with said predetermined value of non-detected times, and a window generator for generating said detecting window having the time width corresponding to said predetermined value of non-detected times when said consecutively non-detected times counted by said counter reach said predetermined value of non-detected times as a result of the comparison by said comparator.

4. The recording medium reproduction device according to claim 3, further comprising a setting circuit for setting said predetermined value of non-detected times and the time width corresponding to said predetermined value of non-detected times into said memory.

5. The recording medium reproduction device according to claim 4, further comprising:

a demodulator for demodulating data obtained from said reproduction signal according to said second synchronizing signal; and an error correction circuit for correcting an error in data demodulated by said demodulator.

6. A recording medium reproduction device comprising:

a synchronizing signal generator for generating a second synchronizing signal by detecting a first synchronizing signal generated from a reproduction signal read from a recording medium in a detecting window having a prescribed time width; and a window controller for increasing said prescribed time width of said detecting window according to a consecutively non-detected times of said first synchronizing signal, wherein said window controller includes:

a counter for counting consecutively non-detected times of said first synchronizing signal in said detecting window, a memory for storing at least a first value of non-detected times, a second value of non-detected times larger than said first value, a first time width corresponding to said first value of non-detected times, and a second time width corresponding to said second value of non-detected times larger than said first time width, a comparator for comparing said consecutively non-detected times counted by said counter with said first and second values of non-detected times, and a window generator for generating said detecting window having first time width when said consecutively non-detected times counted by said counter read said first value and are less than said second value as a result of the comparison by said comparator, and generating said detecting window having said second time width when said consecutively non-detected times counted by said counter reach said second value.

7. A recording medium reproduction device, comprising:

a synchronizing signal generator for generating a frame synchronizing signal by detecting a detection synchronizing signal generated from a reproduction signal read from a recording medium in a detecting window having a prescribed time width;

a demodulator for generating a demodulated data by demodulating data stream obtained from said reproduction signal according said frame synchronizing signal; and an error correction circuit for correcting an error in said demodulated data, wherein said synchronizing signal generator includes a counter for counting consecutively non-detected times of said detection synchronizing signal in said detecting window, a comparator for comparing said consecutively non-detected times counted by said counter with a predetermined value according ability for correcting said error, and a controller for increasing said prescribed time width of the detecting window when said consecutively non-detected times counted by said counter reach said predetermined value, as a result of the comparison by said comparator.

8. The recording medium reproduction device according to claim 7, wherein said controller makes said detecting window full open state when said consecutively non-detected times counted by said counter are more than maximum times for which said error correction circuit can correct the error against the demodulated data stream, as a result of the comparison by said comparator.

* * * * *